No. 710,619. Patented Oct. 7, 1902.
L. C. SHARPLESS.
APPARATUS FOR MIXING DOUGH.
(Application filed Mar. 23, 1901.)
(No Model.)
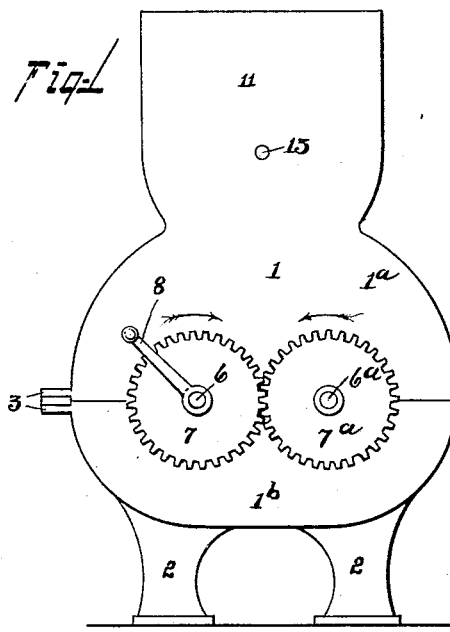
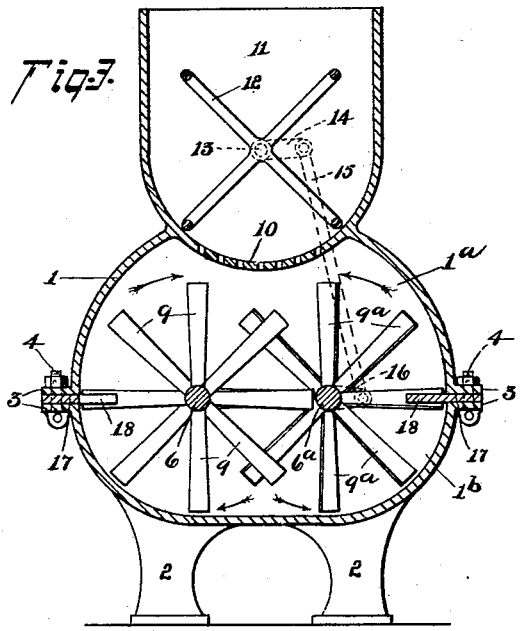
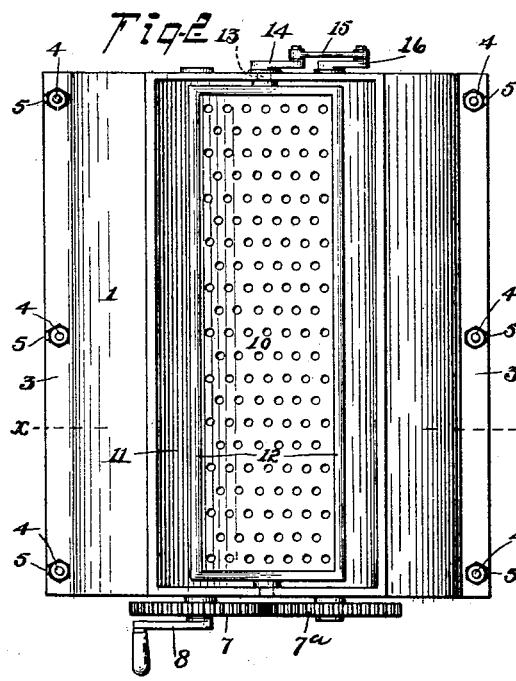
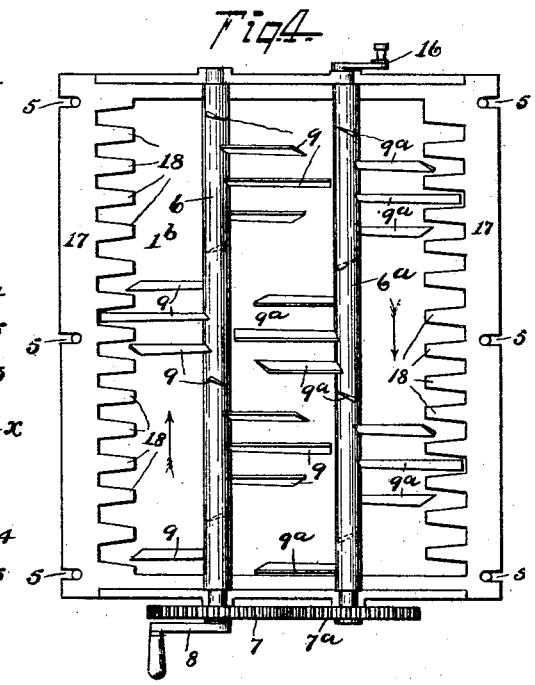
WITNESSES:
Thomas M. Shape
James Meighan
INVENTOR
Lydia Coale Sharpless,
BY
Walter C. Pusey
ATTORNEY

UNITED STATES PATENT OFFICE.

LYDIA COALE SHARPLESS, OF PHILADELPHIA, PENNSYLVANIA, ASSIGNOR TO CYRUS CHAMBERS, JR., OF OVERBROOK, PENNSYLVANIA.

APPARATUS FOR MIXING DOUGH.

SPECIFICATION forming part of Letters Patent No. 710,619, dated October 7, 1902.

Application filed March 23, 1901. Serial No. 52,474. (No model.)

*To all whom it may concern:*

Be it known that I, LYDIA COALE SHARPLESS, a citizen of the United States, residing in the city and county of Philadelphia, State of Pennsylvania, have invented certain new and useful Improvements in Apparatus for Mixing Dough, of which the following is a full, clear, and exact description, reference being had to the accompanying drawings, of which—

Figure 1 is an end elevation. Fig. 2 is a plan view. Fig. 3 is a vertical section on line $x\ x$, Fig. 2. Fig. 4 is a plan view, the upper part of the device having been removed.

My invention relates to machines for mixing dough, &c.

My object has been to produce such a machine in which the flour shall be sifted lightly and automatically in uniform quantities into the water, yeast, and other ingredients usual in making bread and drawing said flour lightly and without material pressure therethrough, whereby each individual flour particle will be completely enveloped in moisture and will be only in light contact with its contiguous flour particles, so that said flour particles may fully expand and develop.

Referring to the accompanying drawings, 1 is a vessel or receptacle, preferably supported upon legs 2. Said vessel is divided horizontally into an upper part or dome-shaped cover $1^a$ and a lower part or basin $1^b$, said parts being provided, respectively, with horizontal flanges 3, detachably secured together in well-known manner, such as by bolts 4, passing through slots 5 through said flanges, the lower ends of said bolts being hinged to the flange 3 of part $1^b$, all as seen in Figs. 2 and 3. Extending longitudinally through said vessel 1 are two horizontally-disposed shafts 6 $6^a$, geared together, so as to rotate in opposite directions, by gears 7 $7^a$ and one thereof, 6, provided with a winch 8 for imparting rotation thereto. Said shafts rotate in journals in the end walls of the vessel 1, one half of the bearing being in the lower part $1^b$ thereof and the other half in the upper part $1^a$, so that when the upper part $1^a$ is removed, as hereinafter set forth, the shafts 6 $6^a$ may be lifted from their bearings and removed. Mounted upon said shafts, respectively, are blades 9 $9^a$, said blades being arranged on their respective shafts in spiral form, as seen, so that when the said shafts are rotated in the direction of the arrows in Figs. 1 and 3 the said blades will interdigitate with one another and will tend to draw any material in the basin part $1^b$ toward opposite ends thereof respectively, as indicated by the arrows in Fig. 4.

Mounted upon the upper part $1^a$ of vessel 1 and its perforated bottom 10, forming the roof or top thereof, is a sieve 11, within which is journaled an agitating-frame 12, said agitating-frame being carried on arbors 13, which are journaled in the end walls of the vessel. On the outer end of one of said arbors is a crank-arm 14, connected by a rod 15 with a crank-arm 16 on shaft $6^a$, so that when said shaft is rotated the agitating-frame 12 will be reciprocated to and fro in said sieve.

Clamped between the upper and lower parts $1^a$ and $1^b$ of vessel 1 is a frame 17, from which project inwardly and on opposite sides of the vessel fingers 18, between which the blades 9 $9^a$ are adapted to pass in their rotation for a purpose hereinafter appearing.

The manner of use of the above-described apparatus is as follows: Rod 15 having been detached from crank-arm 16 and the bolts 4 released from engagement with the flanges 3, the top part $1^a$ is removed. A suitable quantity of water, yeast, and other necessary ingredients usually used in making bread, except the flour, is placed in the basin part $1^b$ of the vessel, and the top part $1^a$ is replaced and secured by bolts 4, and rod 15 is connected to crank-arm 16. A suitable quantity of flour is now placed in the sieve 11, and the device is ready to operate. The operator turns the winch 8 in the direction indicated by the arrows in Figs. 1 and 3, the shafts 6 $6^a$ being thereby rotated and the agitating-frame 12 reciprocated in the sieve 11. Thus the flour in sieve 11 is gradually sifted into vessel 1 and falls lightly into the liquid into the basin portion $1^b$ thereof between the shafts 6 $6^a$; where it is caught by the rotating blades 9 $9^a$ and by them drawn lightly and without material pressure through said liquid, so that the flour particles become completely enveloped in moisture, and as the blades on shafts 6 and 6ª tend to draw the material respectively in opposite longitudinal directions, as hereinbefore referred to and as indicated by the arrows in Fig. 4, the flour is thoroughly mixed throughout the liquid, yet without material pressure, whereby the flour particles are only in light contact with each other and free to expand to their full extent, and the resulting dough is drawn or pulled apart in the air in said vessel by said blades, thus thoroughly aerating and lightening it. The fingers 18 of frame 17 serve to prevent the dough in basin 1ᵇ from being carried around in a mass by the blades 9 9ª. When the winch 8 has been turned for, say, about five minutes, so that all the flour in the sieve 11 has been mixed into the liquid, the rod 15 is detached from crank 16, bolts 4 are released from engagement with flanges 3, and the top part 1ª of vessel 1 is removed. The shafts 6 6ª and the frame 17 are removed, and the dough in the basin 1ᵇ is set to rise in the ordinary well-known manner, and after said dough has risen to the required extent it is made into loaves and baked. As the agitating-frame 12 is actuated from one of the shafts 6 6ª, (from the latter in this instance,) the speed of rotation of said shafts and the speed of the reciprocations of said agitating-frame are directly related—that is, as the speed of rotation of the shafts 6 6ª is increased or diminished the reciprocation of the agitating-frame 12 become more or less frequent, and hence the quantity of flour sifted into the basin 1ᵇ varies directly with the speed of rotation of said shafts, whereby just sufficient flour and no more is sifted into the basin 1ᵇ for the blades 9 9ª to properly mix into the liquid.

Having thus described my invention, I claim as new and desire to secure by Letters Patent—

1. In a machine for mixing dough, the combination of the liquid-containing vessel, the horizontally-disposed parallel shafts therein, provided with the interdigitating blades, means for rotating said shafts in opposite directions, together with the sifter for automatically sifting flour lightly into the liquid in said vessel between blades and shafts, substantially as set forth.

2. In a machine for mixing dough, the combination of the water and yeast containing vessel, the horizontally-disposed parallel shafts therein, provided with interdigitating blades mounted thereon in spiral form respectively, means for rotating said shafts in opposite directions whereby the blades upon one shaft tend to draw the material in the vessel in one longitudinal direction and those on the other shaft in the opposite direction, the sifter carried by said vessel above said shafts, and adapted to sift flour into the liquid in said vessel throughout the entire length thereof, the agitating-frame therein, and means for reciprocating said agitating-frame, substantially as set forth.

3. In a machine for mixing dough, the combination of the liquid-containing vessel divided horizontally into detachably-connected upper and lower parts, the horizontally-disposed parallel shafts, carrying the interdigitating blades, said shafts being journaled in the end walls of the vessel, one half of said journals being in the upper part thereof and the other half in the lower part thereof, the sieve carried by the upper part of said vessel above said shafts, means for rotating said shafts in opposite directions and means for sifting flour automatically from said sieve into the liquid in said vessel, substantially as and for the purpose set forth.

4. In a machine for mixing dough, the combination of the vessel divided horizontally into detachably-connected upper and lower parts, the horizontally-disposed parallel shafts carrying the interdigitating blades, said shafts being journaled in the end walls of the vessel, one half of said journals being in the upper part thereof and the other half in the lower part thereof, the sieve carried by the upper part of said vessel above said shafts, means for rotating said shafts in opposite directions, means for sifting flour automatically from said sieve into the vessel, together with the removable frame having the fingers projecting inwardly therefrom into the vessel between which fingers the blades on said shafts are adapted to pass, substantially as set forth.

5. In a machine for mixing dough, the combination of the vessel, the horizontally-disposed shafts therein provided with the interdigitating blades, means for rotating said shafts in opposite directions, the sifter above said shafts, the agitating-frame therein, connections between one of said shafts and the agitating-frame, whereby the latter is reciprocated at intervals corresponding with the speed of rotation of said shafts, substantially as and for the purpose set forth.

In testimony whereof I have hereunto affixed my signature this 12th day of March, A. D. 1901.

LYDIA COALE SHARPLESS.

Witnesses:
ANDREW V. GROUPE,
WALTER C. PUSEY.